W. S. SUMNER.
ANTIGLARE ATTACHMENT.
APPLICATION FILED OCT. 27, 1919.
1,358,262.
Patented Nov. 9, 1920.
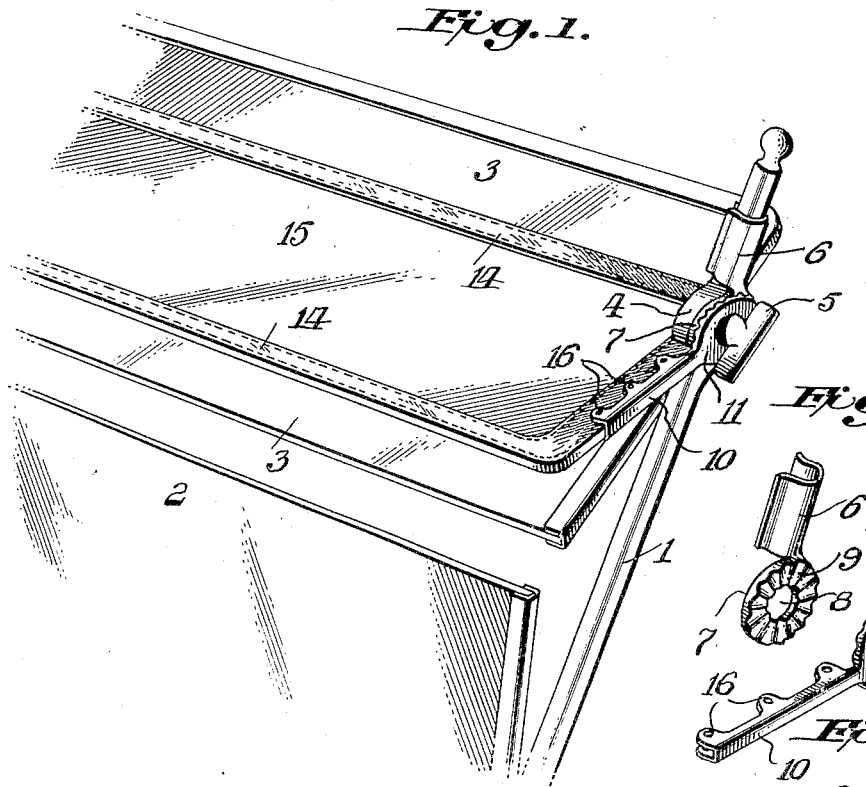
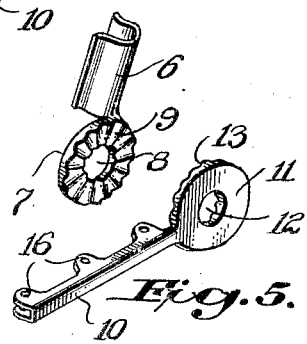
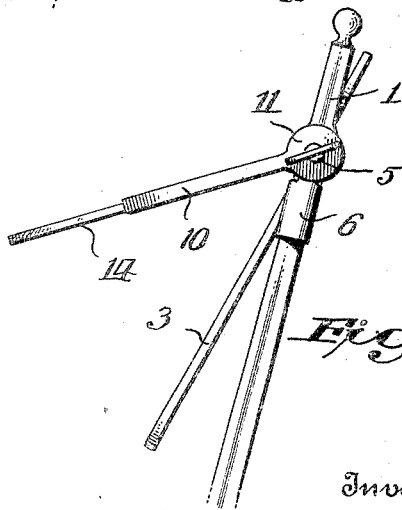
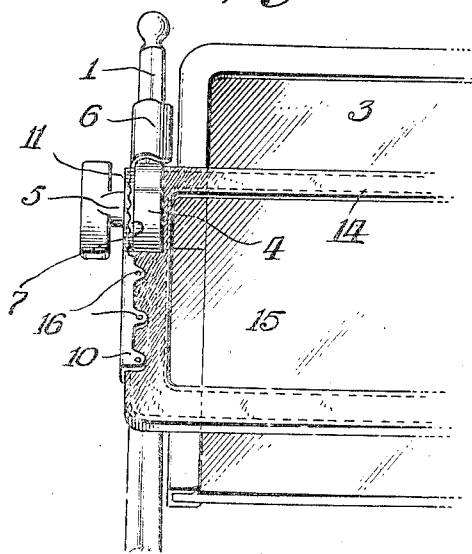
Inventor
Warren S. Sumner,
By
Attorneys

UNITED STATES PATENT OFFICE.

WARREN S. SUMNER, OF HIGHLAND PARK, MICHIGAN.

ANTIGLARE ATTACHMENT.

1,358,262.   Specification of Letters Patent.   Patented Nov. 9, 1920.

Application filed October 27, 1919. Serial No. 333,617.

*To all whom it may concern:*

Be it known that I, WARREN S. SUMNER, a citizen of the United States of America, residing at Highland Park, in the county of Wayne and State of Michigan, have invented certain new and useful Improvements in Antiglare Attachments, of which the following is a specification, reference being had therein to the accompanying drawings.

My invention aims to furnish the windshield of an automobile or similar vehicle with an anti-glare attachment which may be easily and quickly installed on the usual type of windshield and adjusted at a desired angle so that the glare of the sun, reflected light, headlights, arc lamps or other bright spots will not interfere with the vision of an automobile chauffeur or driver; it being my aim to reduce, if not completely eliminate the accidents incident to chauffeurs and drivers being temporarily blinded by bright lights.

My invention further aims to provide an anti-glare windshield attachment embodying simple, durable and inexpensive pieces of hardware, which together with the shield or visor, may be finished to harmonize with the windshield or other metallic fittings of the vehicle.

My invention will be hereinafter considered and then claimed, and reference will now be had to the drawings, wherein—

Figure 1 is a perspective view of a portion of a windshield provided with an attachment in accordance with my invention;

Fig. 2 is a front elevation of the same;

Fig. 3 is a side elevation of the windshield attachment showing the reverse arrangement of a piece of hardware thereon;

Fig. 4 is a perspective view of a detached windshield frame engaging member, and Fig. 5 is a similar view of the visor engaging member.

In the drawings, the reference numeral 1 denotes the side frame of a conventional form of automobile windshield which includes a lower sash 2 and an upper sash 3, these sashes in some types of windshield, being adjustable so that the ashes may be swung at a desired angle. The adjusting means of the upper sash 3 includes a socket 4 and a screw bolt 5, the latter being tightened to hold the upper sash 3 in an adjusted position. It is on the screw bolt 5, at each side of the windshield, that I place my attachment and utilize the screw bolts to hold the attachment in an adjusted position.

The attachment comprises frame engaging members 6 that are somewhat channel shape or in the form of clasps that may be sprung over the frame 1, above or below the socket 4. For instance, the member 6 has been shown above the socket 4 in Fig. 1, but as illustrated in Fig. 3, the member may be placed in engagement with the windshield frame below said socket. Formed integral with the member 6 is a head 7 having a central opening 8 to receive the screw bolt 5, said head being placed against the outer face of the socket 4. The outer face of the head 7 has circumferentially disposed teeth 9 and these teeth may be in the form of radially disposed corrugations or any roughened surface with which another may frictionally engage or interlock.

On the screw bolts 5 at the outer sides of the frame engaging members 6 are placed visor supporting members 10 having heads 11 with central openings 12 to receive the bolts 5, said heads having the inner faces thereof provided with teeth or corrugations corresponding to the teeth or corrugations 9 of the heads 7, so that the heads 7 and 11 may interlock or frictionally engage each other. By tightening the screw bolts 5 the heads 7 and 11 may be locked together so that the member 10 will be held in adjusted position relative to the member 6, and by releasing the screw bolt 5 it is possible to shift the member 10 to any desired angle relative to the member 6 and then tighten the screw bolt to lock the member 10 in such position. Some windshields however, are devoid of the screw bolts 5 or any member on which the heads 7 and 11 may be conveniently placed, so in such cases the windshield frame of a bow of an automobile top may be provided with studs to accommodate the heads of the pieces of hardware.

The member 10 is preferably channel shaped and provided with a series of apertured lugs 16 so that said member may be suitably connected to a visor frame 14 having its end placed in the member 10, as shown in Figs. 1 and 2. The visor frame 14 may be cut away to provide clearance for the socket 5 of the windshield, and the rear or inner edge of the frame 14 may be placed as close as possible to the axis of the pivoted windshield sash 3, so that the visor frame 14 may be swung to a desired angle relative to the windshield sash 3. The visor frame 14 may be made of any suitable material and is adapted to support a panel 15. The panel 15 may be made of transparent or semi-transparent material, as celluloid or waterproof cloth, and in some instances it may be made of opaque material, as leather. Therefore I do not care to confine myself to any specific material as it will be optional with the manufacturer to use the material suitable to climatic conditions in the locality for which the visor is intended. The visor frame 14 will possess sufficient rigidity to maintain the panel 15 taut against wind pressure and the elements.

While in the drawing there is illustrated a preferred embodiment of my invention, it is to be understood that the structural elements are susceptible to such variations and modifications as fall within the scope of the appended claim.

What I claim is:—

The combination of a visor, hardware therefor so that the visor may be attached to a windshield, comprising a clasp-like member sprung into engagement with a windshield frame, a head carried by said member, a member adapted to fit on and be connected to said visor, a head carried by said visor member, and means adapted to form part of a wind shield pivot and connect the heads of said members and adapted to hold one member relative to the other.

In testimony whereof I affix my signature in the presence of two witnesses.

WARREN S. SUMNER.

Witnesses:
 ANNA M. DORR,
 KARL H. BUTLER.